United States Patent
Ghantous et al.

(10) Patent No.: US 10,392,515 B2
(45) Date of Patent: Aug. 27, 2019

(54) METAL CANS COATED WITH SHELLAC-CONTAINING COATINGS

(71) Applicant: PPG Industries Ohio, Inc., Cleveland, OH (US)

(72) Inventors: Amanda Ghantous, Cincinnati, OH (US); Christopher Most, Wilder, KY (US); Robert McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 29 days.

(21) Appl. No.: 15/686,404

(22) Filed: Aug. 25, 2017

(65) Prior Publication Data

US 2019/0062565 A1    Feb. 28, 2019

(51) Int. Cl.
| | | |
|---|---|---|
| *C09D 193/02* | (2006.01) | |
| *C09D 5/08* | (2006.01) | |
| *B05D 7/14* | (2006.01) | |
| *B05D 7/22* | (2006.01) | |
| *B65D 25/14* | (2006.01) | |
| *C09D 167/00* | (2006.01) | |
| *C09D 183/04* | (2006.01) | |
| *B65D 1/12* | (2006.01) | |
| *C08L 93/02* | (2006.01) | |

(52) U.S. Cl.
CPC ................ *C09D 5/08* (2013.01); *B05D 7/14* (2013.01); *B05D 7/227* (2013.01); *B65D 25/14* (2013.01); *C09D 167/00* (2013.01); *C09D 183/04* (2013.01); *C09D 193/02* (2013.01); *B65D 1/12* (2013.01); *C08L 93/02* (2013.01)

(58) Field of Classification Search
CPC .......... C09D 5/08; C09D 193/02; B05D 7/14; B05D 7/16; B65D 25/14
USPC ...................................................... 106/14.34
See application file for complete search history.

(56) References Cited

U.S. PATENT DOCUMENTS

| | | | |
|---|---|---|---|
| 2,175,972 A * | 10/1939 | Rainer | B05D 7/227 |
| | | | 220/62.12 |
| 2,991,262 A | 7/1961 | Johnston | |
| 5,030,486 A | 7/1991 | Huang et al. | |
| 5,221,331 A | 6/1993 | Ikari et al. | |
| 5,451,304 A * | 9/1995 | Markfort | C09D 5/4484 |
| | | | 204/479 |
| 7,785,894 B2 | 8/2010 | Smolander et al. | |
| 8,440,265 B2 | 5/2013 | Duan | |
| 8,871,319 B2 | 10/2014 | Stanley et al. | |
| 9,102,125 B2 | 8/2015 | Battersby et al. | |
| 9,296,656 B2 | 3/2016 | Shenderova et al. | |
| 2004/0109853 A1 | 6/2004 | McDaniel | |
| 2009/0326121 A1* | 12/2009 | Stockl | C08L 93/04 |
| | | | 524/287 |

FOREIGN PATENT DOCUMENTS

WO    2016114966    7/2016

OTHER PUBLICATIONS

Anonymous, "Shellac"; Wikipedia—URL:https://en.wikipedia.org/wiki/Shellac; Jan. 1, 2018; pp. 1-8; Internet.

Anonymous, "D5402-15 (2015) Standard Practice for Assessing the Solvent Resistance of Organic Coatings Using Solvent Rubs"; ASTM—URL:https://compass.astm.org/download/D540.2.23901.pdf; Jun. 1, 2015; pp. 1-5; Internet; ASTM International, West Conshohocken, Pennsylvania, United States of America.

Velji, Vijay, "Hardness and Chemical Resistance Testing for Royal-Lac"; URL:http://www.shellacfinishes.com/wp-content/uploads/2015/08/Hardness_Chemical-Resistance-test-results.pdf;Jul. 30, 2015; pp. 1-8; Internet.

Anonymous, "Henley's Twentieth Century Formulas, Recipes and Processes"; Henley's Twentieth Century Formulas, Recipes and Processes; Jan. 1, 1914; pp. 81, 438, 440 and 497; The Norman W. Henley Publishing Company, New York, New York, United States of America.

* cited by examiner

*Primary Examiner* — Lee E Sanderson
*Assistant Examiner* — Michael C Romanowski
(74) *Attorney, Agent, or Firm* — Diane R. Meyers

(57) ABSTRACT

Metal cans coated at least in part with a coating composition comprising shellac are disclosed.

8 Claims, No Drawings

METAL CANS COATED WITH SHELLAC-CONTAINING COATINGS

FIELD OF THE INVENTION

The present invention is directed to metal cans coated at least in part with coatings comprising shellac.

BACKGROUND OF THE INVENTION

The application of various polymeric coatings to metallic substrates, including metal cans such as food, beverage and cosmetic containers, to retard or inhibit corrosion is well established. Coatings are applied to the interior of such containers to prevent the contents from contacting the metal of the container. Contact between the metal and the food, beverage or cosmetic can lead to corrosion of the metal container, which can then contaminate the product. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. A reduced use of formaldehyde in coatings may also be desired.

SUMMARY OF THE INVENTION

The present invention is directed to metal cans coated at least in part with a coating comprising shellac.

DETAILED DESCRIPTION OF THE INVENTION

The present invention is directed to metal cans coated at least in part with a coating comprising shellac. Shellac is secreted by the female lac bug, and is therefore a renewable resource. Shellac is commercially available from Renshel in India, such as in solid form as RENSHEL 101. The shellac may be present in the composition in any desired amount, such as 5 wt % or greater, 10 wt % or greater, 15 wt % or greater, 20 wt % or greater or 25 wt % or greater, and such as 95 wt % or lower, 90 wt % or lower, 75 wt % or lower, 60 wt % or lower, or 50 wt % or lower, with wt % based on total solids of the coating composition. Any of the ranges within these parameters can be used. For example, the shellac may be present in amounts of 5 to 75 wt %, 5 to 50 wt %, 5 to 40 wt %, 5 to 35 wt %, 5 to 25 wt %, 5 to 15 wt %, 10 to 25 wt %, 10 to 20 wt %, 8 to 15 wt % and the like.

The coating compositions used according to the present invention can be an organic or inorganic coating composition.

The coating compositions used according to the present invention can also contain one or more other components. These components may be components approved for use in the packaging industry. For example, the coating composition may further comprise a film-forming component. A film forming component may include, for example, a film forming resin and a crosslinker therefor. Any film forming resin can be used according to the present invention. The film-forming resin can comprise, for example, an acrylic polymer, a polyester polymer, a polyurethane polymer, a polyamide polymer, a polyether polymer, a polysiloxane polymer, copolymers thereof, and mixtures thereof. Generally, these polymers can be any polymers of these types made by any method known to those skilled in the art. Such polymers may be solvent-borne or water-dispersible, emulsifiable, or of limited water solubility. The film forming resin will typically have functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, silanol groups, alkoxy groups and combinations thereof. Appropriate mixtures of film-forming resins may also be used in the preparation of the present compositions. The film forming component may also comprise a crosslinker having functional groups reactive with the functional groups on the resin. One skilled in the art can select an appropriate crosslinker based on this functionality from crosslinkers such as melamine such as melamine formaldehyde resin, phenolic such as phenolic formaldehyde resin, carbodiimide, hydroxyalkylamide, hydroxyalkyurea, isocyanate, blocked isocyanate, benzoguanamine, TGIC, epoxies, oxazolines, organosilanes and the like. The film forming resin may also be self-crosslinking; that is, the resin will react with itself to cure. Examples of such resins include polysiloxane resins that contain silanol (Si—OH), alkoxy groups (Si—O—R), or acetoxy groups (Si—O—COCH3), which can condense or become reactive due to the presence of moisture and heat to self-condense.) The film forming resin can be used in an amount of 20 wt % or greater, such as 30 wt % or greater or 40 wt % or greater, and such as 60 wt % or lower, 50 wt % or lower or 40 wt % or lower, with wt % based on the total solid weight of the composition. Any wt % ranges within these parameters can be used. A wt % of 20 to 50 may be particularly suitable.

A particularly suitable film forming resin is an acrylic resin. The acrylic resin, for example, may be formed by using any number of acrylic monomers, including styrene, alkyl (meth)acrylates such as ethyl (meth)acrylate, methyl (meth)acrylate, and butyl (meth)acrylate, functional acrylates such as hydroxyethyl (meth)acrylate, and acrylamides such as n-butoxy methyl acrylamide. For example, an acid functional (meth)acrylic acid and an alkyl (meth)acrylate may each be used. Mixtures of (meth)acrylic resins can also be used. It will be understood that (meth)acrylic and like terms refers to both methacrylic and acrylic. According to the present invention, the acrylic resin may exclude or be substantially free of hydroxyl functional acrylic monomers, styrene and/or vinyl chloride monomers; in this context "substantially free" means these monomers are not intentionally used in the polymerization of the acrylic and are therefore present, if at all, in an amount of 1 wt % or less, based on total wt % of the monomers. The acrylic resin may exclude ethyl acrylate and/or acrylamide, such as n-butoxy methyl acrylamide. In addition, when using an acrylic resin in the present compositions, the (meth)acrylic resin may be substantially free of unreacted unsaturation. That is, reaction of the (meth)acrylic monomers in the formation of the (meth)acylic resin will consume the unsaturation. Thus, the (meth)acrylic resins used according to the present invention are not radiation curable, and any residual unsaturation that might remain in the (meth)acrylic resin upon reaction of the monomers is not enough to render the (meth)acrylic resin radiation curable.

As noted above, the present compositions may comprise a crosslinker, including one or more crosslinkers. Benzoguanamine is a particularly suitable crosslinker and, if used, can be present in the composition in an amount of 5 wt % or greater, such as 7.5 wt % or greater or 10 wt % or greater, and such as 35 wt % or less, 30 wt % or less, or 25 wt % or less, with wt % based on the total solids weight of the composition. Any wt % ranges within these parameters can be used. A wt % of 10 to 30 is particularly suitable. A phenolic resin or crosslinker, such as a phenol formaldehyde resin, can also be included in the compositions used according to the present invention, either alone or in conjunction with another crosslinker. For certain applications, however, it may be desired to minimize, if not eliminate, the amount of phenolic used in coating compositions in the packaging industry. It will be appreciated that phenolics are often made with formaldehyde and therefore bring formaldehyde into the composition. It was surprisingly discovered that the amount of phenolic can be minimized, and even eliminated, in compositions also comprising shellac. For example, a typical commercial coating composition may contain 50 wt % phenolic. Coating compositions used according to the present invention may contain 40 wt % or less of phenolic resin, such as 30 wt % or less, 25 wt % or less, 20 wt % or less, 15 wt % or less, 10 wt % or less, 5 wt % or less, 2 wt % or less, or 1 wt % or less, with wt % based on the total solids weight of the composition. The compositions may also be completely free of phenolic, which will be understood as referring to being completely free of any added phenolic, with any trace amounts of phenolic brought in through other coating components.

Other components may also be included in the composition. For example, an epoxidized vegetable oil ("EVO") can be used, and can either be obtained commercially or prepared by epoxidizing a vegetable oil. Vegetable oils include but are not limited to corn, cottonseed, linseed, rapeseed, tall, palm, peanut, sesame, sunflower, and soy. Epoxidized soy bean oil ("ESBO") is particularly suitable and is commercially available from a number of sources, such as Hallstar, as PLASTHALL ESO, and Arkema, in its VIKOFLEX line, such as VIKOFLEX 7170. ESBO and other epoxidized vegetable oils are known as plasticizers in materials using vinyl chlorides. It was surprisingly discovered that a coating composition comprising EVO with an amine terminated polyamide imparts greater corrosion resistance to a metal substrate when such composition is cured as compared to a cured composition having only EVO or only an amine terminated polyamide. The amount of EVO if used in the compositions used according to the present invention can vary, such as 5 wt % or greater, 7.5 wt % or greater, 10 wt % or greater or 12 wt % or greater, and such as 20 wt % or lower or 15 wt % or lower, with wt % based on the total solids weight of the composition. Any wt % ranges within these parameters can be used. A wt % of 10-12 may be particularly suitable.

Any amine terminated polyamide can be used in the compositions used according to the present invention. The polyamide, for example, can be based on a dimer acid. Suitable amine values for the polyamide can vary based on the needs of the user and can range, for example, from 50 to 250, such as from 220 to 250, or 232 to 242, as determined by titration with HBr in HBr/acetic acid using methyl violet indicator. The viscosity of the polyamide can also vary, and can range, for example, from 400 to 800, such as 550 to 700 poise, when measured with a #3 spindle at 20 RPM by Brookfield viscometer at 40° C. Polyamides are widely commercially available, such as from Hexion in their EPIKURE line. The amount of amine terminated polyamide in the compositions can vary, such as 2 wt % or greater, 3.5 wt % or greater, or 5 wt % or greater, and such as 15.0 wt % or lower, 12.5 wt % or lower, or 10 wt % or lower, with wt % based on the total solids weight of the composition. Any wt % ranges within these parameters can be used. A wt % of 3 to 12 may be particularly suitable.

If the compositions used according to the present invention comprises EVO, the EVO can be pre-reacted with another coating component before addition to the coating composition or can be reacted with another coating component only upon cure of the coating composition. For example, it may be desired that the EVO is not pre-reacted with any of the other coating components in the composition. It may be desired that the EVO undergoes reaction with an amine terminated polyamide, if used, only upon heat cure. Upon curing with heat the oxirane functionality of the EVO reacts with the primary amine of the amine terminated polyamide to form a hydroxyl and a secondary amine. The reaction during cure is particularly suitable for applications regulated by the FDA. Alternatively, and particularly when FDA considerations are not relevant, the EVO can be pre-reacted with the amine terminated polyamide, or any other coating component, prior to cure. The EVO does not undergo transesterification with any other component, and is not a plasticizer or hydrogen chloride scavenger.

A silicon may be used in the compositions used according to the present invention, such as a silicone resin or combination of silicone resins. Particularly suitable are silsesquioxane resins, including silanol functional silsesquioxanes. Suitable silicone resins, including silanol functional silsesquioxanes, are commercially available from Dow Chemical in their RSN line. RSN 217, for example, is a fully phenylated silanol functional silsesquioxane and with a degree of substitution of 1.0. RSN 233, for example, is a silanol functional silsesquioxane with a phenyl to methyl ratio of 1.3:1 and a degree of substitution of 1.15. RSN 255, for example, is also a silanol functional silsesquioxane with a phenyl to methyl ratio of 0.84:1 and a degree of substitution of 1.05. All of these values are as reported by the manufacturer, Dow. Also suitable for use are silicon mixtures comprising at least one silicon-bonded hydrogen and a silicone comprising at least one ethylenically unsaturated group, such as the silicone component described in U.S. Ser. No. 15/278,064. The amount of silicone resin in the compositions can vary, such as 10 wt % or greater, 15 wt % or greater, 20 wt % or greater or 25 wt % or greater, and such as 60 wt % or lower or 50 wt % or lower or 40 wt % or lower, with wt % based on the total solids weight of the composition. Any wt % ranges within these parameters can be used. A wt % or 15 to 50 may be particularly suitable.

The coating composition used according to the present invention may comprise one or more solvents including water or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". The composition may be aqueous or water-based. This means that 50% or more of the solvent is water. These embodiments have less than 50%, such as less than 20%, less than 10%, less than 5% or less than 2% solvent.

The composition may be in solid particulate form, i.e. a powder coating. Such coatings will be appreciated as being environmentally friendly, as only water is released on cure.

If desired, the compositions can comprise other optional materials well known in the art of formulating, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents, moisture scavenger and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention have minimal migration out of the coating. Example photosensitive compositions and/or photochromic compositions and methods for making them are identified in U.S. Pat. No. 8,153,344, and incorporated herein in pertinent part by reference.

In general, the colorant can be present in any amount sufficient to impart the desired visual and/or color effect. The colorant may comprise from 1 to 65 wt % of the present compositions, such as from 3 to 40 wt % or 5 to 35 wt %, with weight percent based on the total weight of the composition.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning. A wax can also be used such as polyolefin wax, silicone or paraffin.

The coating compositions used according to the present invention, may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof. The coating compositions used according to the present invention may be substantially, essentially and/or completely free of metallic, such as metallic silver, metallic copper and the like.

The compositions used in the present invention can be applied by any means standard in the art, such as electrocoating, spraying, electrostatic spraying, dipping, rolling, brushing, and the like.

The compositions can be applied to the metal can to a dry film thickness of 0.04 mils to 4 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired.

The metal cans of the present invention are coated at least in part with a coating comprising shellac. Such compositions can be used alone, or in combination with one or more other compositions, such as a coating system having two or more layers. For example, the compositions comprising shellac can comprise a colorant or not and can be used as a primer, base-coat, and/or top coat. For substrates coated with multiple coatings, one or more of those coatings can be coatings as described herein. The coatings comprising shellac can be used as a packaging "size" coating, wash coat, spray coat, end coat, and the like. The metal cans of the present invention can be coated on the inside and/or outside at least in part with a coating comprising shellac.

The application of various pretreatments and coatings to metal cans is well established. Such treatments and/or coatings include those wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food, beverage or cosmetic, for example, can lead to corrosion of a metal container, which can then contaminate the food, beverage or cosmetic. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content and/or high acid content. Coatings can also be applied to the exterior of metal cans. The coatings used according to the present invention can be applied to coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The metal cans according to the present invention include cans used to contain any food, beverage, cosmetic or other item, particularly for shipping from a point of manufacture to a consumer, and for subsequent storage by a consumer. A metal can will be therefore understood as something that is sealed so as to keep its contents free from deterioration until opened by a consumer, and often after opening, such as in the case of monobloc tubes that dispense cosmetic products such as hair products, sunscreen and the like and other aerosol cans that dispense sunscreen, bug spray, cleaning products and the like. The manufacturer will often identify the length of time during which the food or beverage will be free from spoilage, which typically ranges from several months to years. Thus, the present "metal can" is distinguished from a storage container or metal pan or bakeware in which a consumer might make and/or store food; such a container would only maintain the freshness or integrity of the food item for a relatively short period. The term "metal can" includes any type of metal can, container or any type of receptacle or portion thereof that is sealed by the food/beverage/cosmetic manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, cosmetics, such as personal care products, bug spray, spray paint, and any other compound suitable for packaging in an aerosol can. The cans can include "two piece cans" and "three-piece cans" as well as drawn and ironed one-piece cans; such one piece cans often find application with aerosol products.

The coating can be applied to the interior and/or the exterior of the metal can. For example, the coating can be rollcoated or sprayed onto metal used to make a two-piece food can, a three-piece food can, can end stock and/or cap/closure stock. The coating is applied to a coil or sheet such as by roll coating or spray coating; the coating is then cured and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to the inside of the metal can such as by spray coating, and can be used as the only inside coating, with another coating layer on top, with another coating layer underneath, or with another coating layer both under and over the layer comprising shellac.

After application to the substrate, the coating composition may be cured by any appropriate means. In some applications a cure of 425° F. or lower, such as 415 or lower or 400 or lower for 15 minutes or less, such as 5 minutes or less, or 4.5 minutes or less may be desired and can be achieved according to the present invention. Other cure conditions, such as higher temperature for shorter periods may also be appropriate depending on the application. For example, a temperature of 800° F. for 1 minute or less, such as 30 seconds or less may be desired.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" coating composition comprising shellac, "a" silicone, "an" amine terminated polyamide, "an" EVO, "a" film forming component, "a" film forming resin, "a" crosslinker and the like, one or more of each of these and any other components can be used. As used herein, the term "polymer" refers to oligomers and both homo-polymers and copolymers, and the prefix "poly" refers to two or more. (Meth)acrylic, and like terms, refers to both acrylic and methacrylic. Including, for example and like terms means including, for example, but not limited to. When ranges are given, any endpoints of those ranges and/or numbers within those ranges can be combined within the scope of the present invention. When maximum and minimum amounts are given, any such amounts can be combined to specify ranges of ingredients numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the invention include:
1. A metal can coated at least in part with a coating composition comprising shellac.
2. The can of Aspect 1, wherein the coating composition comprises 5 to 40 wt % of shellac, based on the total solid weight of the composition.
3. The can of any of the preceding Aspects, wherein the coating composition comprises epoxidized vegetable oil, such as epoxidized soy bean oil, such as in a wt % of 10 to 15 wt % epoxidized soy bean oil, based on the total solid weight of the composition.
4. The can of any of the preceding Aspects, wherein the coating composition comprises an amine terminated polyamide, such as a polyamide having an amine value of 220 to 250, as determined by titration with HBr in HBr/acetic acid using methyl violet indictor.
5. The can of any of the preceding Aspects, wherein the coating composition comprises a silicon, such as a silicone comprising a silanol functional silsesquioxane silicone resin.
6. The can of any of the preceding Aspects, wherein the coating composition comprises 40 wt % or less phenolic resin, where weight percent is based on the total solid weight of the coating.

7. The can of Aspect 6, wherein the composition comprises 10 wt % or less phenolic resin, where wt % is based on the total solids weight of the coating.
8. The can of Aspect 6, wherein the composition comprises 5 wt % or less phenolic resin, where wt % is based on the total solid weight of the coating.
9. The can of Aspect 6, wherein the composition comprises 1 wt % or less phenolic resin, where wt % is based on the total solid weight of the coating.
10. The can of any of the preceding Aspects, further comprising an acrylic resin.
11. The can of Aspect 10, wherein the acrylic resin comprises structural units derived from (meth)acrylic acid and alkyl (meth)acrylate.
12. The can of any of the preceding Aspects, further comprising benzoguanamine.
13. The can of any of the preceding Aspects, wherein the can is coated on the inside at least in part with the coating composition comprising shellac.
14. The can of any of the preceding Aspects, wherein the coating composition is substantially free of hydroxyl functional acrylic monomers, styrene and/or acrylamide.
15. The can of Aspect 13, wherein the can is coated on the inside at least in part with the coating composition comprising shellac and with no other coating composition.

Whereas particular embodiments of this invention have been described above for purposes of illustration, it will be evident to those skilled in the art that numerous variations of the details of the present invention may be made without departing from the invention as defined in the appended claims.

EXAMPLES

Example 1

Coating composition A was made by mixing the ingredients shown in a Cowels type mixer at high speed, 1100 rpm.

Coating A Resin Solids

| Component | % Resin solids |
| --- | --- |
| Acrylic A | 20 |
| Epoxidized soya bean oil from Hallstar | 9.3 |
| EPIKURE 3115[1] | 8.2 |
| CYMEL 1123[2] | 12.5 |
| RSN 233 silicone[3] | 40.2 |
| RENSHEL 101[4] | 9.8 |
| | 100 |

[1]EPIKURE 3115 = amine terminated polyamide
[2]CYMEL 1123 = Benzoguanamine from Allnex
[3]RSN 233 = Silsesquioxane silicone from Dow Chemical
[4]RENSHEL 101 = Shellac from Renshel

| Acrylic A Solids | Wt % |
| --- | --- |
| Styrene | 30% |
| Butyl acrylate | 39% |
| Methacrylic acid | 30% |
| n-BMA | 1% |
| | 100% |

The mixture as prepared above was dispersed in water to 30% solids and a viscosity of 22 seconds as measured using a Ford cup #4 at a temperature of 78° F.

Coating A Solution in Water

| Acrlyic A @ 35% solids in butyl cellosolve | 565 |
| --- | --- |
| Epoxidized soya bean oil 100% solids | 92 |
| EPIKURE 3115 @ 80% solids in butanol | 102 |
| CYMEL 1123 100% solids | 124 |
| RSN 233 silicone @ 70% solids in butanol | 569 |
| RENSHEL @ 60 solids in butanol | 162 |
| D.I. Water | 1688 |
| Total | 3300 |

Example 2

Coating composition B was made by mixing the ingredients shown below in a Cowels type mixer at high speed, 1100 rpm.

Coating B Resin Solids

| Component | % Resin solids |
| --- | --- |
| Acrylic A | 18.7 |
| Epoxidized soya bean oil from Hallstar | 10.7 |
| EPIKURE 3115 | 8.2 |
| CYMEL 1123 | 12.5 |
| RSN 233 silicone | 35.1 |
| RENSHEL 101 | 14.8 |
| | 100 |

The mixture as prepared above was dispersed in water to 30% solids and a viscosity of 22 seconds as measured using a Ford cup #4 at a temperature of 78° F.

Coating B Solution in Water

| Acrlyic A @ 35% solids in water | 529 |
| --- | --- |
| Epoxidized soya bean oil 100% solids | 106 |
| EPIKURE 3115 @ 80% solids in butanol | 101 |
| CYMEL 1123 100% solids | 123 |
| RSN 233 silicone @ 70% solids in butanol | 496 |
| RENSHEL @ 60 solids in butanol | 244 |
| D. I. Water | 1700 |
| Total | 3300 |

Example 3

Coating composition C was made by mixing the ingredients shown below in a Cowels type mixer at high speed, 1100 rpm.

Coating C Resin Solids

| Component | % Resin solids |
| --- | --- |
| Acrylic A | 18.2 |
| Epoxidized soya bean oil from Hallstar | 11.7 |
| EPIKURE 3115 | 7.6 |
| CYMEL 1123 | 12.1 |
| RSN 233 silicone | 10.2 |
| RENSHEL 101 | 40.2 |
| | 100 |

The mixture as prepared above was dispersed in water to 30% solids and viscosity of 22 seconds as measured using a Ford cup #4 at a temperature of 78° F.

Coating A Solution in Water

| | |
|---|---|
| Acrylic A @ 35% solids in water | 515 |
| Epoxidized soya bean oil 100% solids | 116 |
| EPIKURE 3115 @ 80% solids in butanol | 94 |
| CYMEL 1123 100% solids | 120 |
| RSN 233 silicone @ 70% solids in butanol | 144 |
| RENSHEL @ 60 solids in butanol | 663 |
| D.I. Water | 1648 |
| Total | 3156 |

Example 4

Coatings A-C were airless spray applied onto 300×407 cans to a film weight of 300 mgs+/−10 mgs with a Sprimag commercial spray machine using Nordson MEG guns with the following dwell times and spray nozzles.

Spray Parameters

| | Dwell Time in Milliseconds | Nozzle Type | Pressure |
|---|---|---|---|
| Gun #1 | 108 MS | 1097007 | 750 psi |
| Gun #2 | 100 Ms | 121999 | 800 psi |

The sprayed cans were cured in an inside bake oven with oven settings that resulted in the bottom of the can (the dome) reaching a temperature of at least 400° F. for 1 minute 45 seconds. For the test pack, commercially available Chicken Noodle Soup was heated to 160° F. then put into the sprayed and cured 300×407 cans with a 3/16 in headspace. An end was seamed on the cans. The cans were then steam processed at 250° F. for one hour. After processing, the cans were cooled to room temperature overnight and finally stored at 120° F. for one or two weeks. Following either one or two weeks, as indicated below, corrosion was rated visually on a scale of 1-10 with 10 being no corrosion. A rating of 8.0 or higher in the top 1 inch of the can is generally considered acceptable. Three cans were tested for each.

Test Pack Results:

| Coating A | |
|---|---|
| Corrosion top ¼ in of can 1 week at 120° F. | Corrosion top 1 in of can 1 week at 120° F. |
| 7.8 | 9.3 |
| 7.8 | 9.3 |
| 6.5 | 8.3 |

| Coating B | |
|---|---|
| Corrosion top ¼ in of can 1 week at 120° F. | Corrosion top 1 in of can 1 week at 120° F. |
| 9.5 | 9.3 |
| 8.4 | 9.1 |
| 6.5 | 8.2 |
| 2 weeks at 120° F. | 2 weeks at 120° F. |
| 7.0 | 8.4 |
| 7.8 | 9.0 |
| 7.8 | 8.9 |

| Coating C | |
|---|---|
| Corrosion top ¼ in of can 1 week at 120° F. | Corrosion top at 1 in of can 1 week at 120° F. |
| 9.7 | 9.9 |
| 8.6 | 9.7 |
| 10 | 10 |
| 2 weeks at 120° F. | 2 weeks at 120° F. |
| 8.1 | 9.2 |
| 8.1 | 9.2 |
| 8.1 | 8.9 |

As can be seen in the above table as the level of Shellac is increased in the coating composition the corrosion resistance, especially in top ¼" and 1" of the can, improves correspondingly.

Example 5

Coating compositions both with and without shellac were made using the amounts (given in grams and % resin solids) shown in the table below. The coatings were prepared by charging the polyester resin to an appropriate sized stainless steel mixing vessel. A light'n mixer equipped with a stainless steel propeller blade was lowered into the mixing vessel and agitation was turned on medium-high speed. The remaining components were added one by one while continuing to mix. After the last component was added, the composition was mixed at medium-high speed for 15 minutes.

| | Coating D (grams/% resin solids) | Coating E (grams/% resin solids) |
|---|---|---|
| polyester resin[5] | 64.52/74.76 | 64.52/83.16 |
| phenolic[6] | 12.5/14.48 | 12.5/16.12 |
| RENSHEL 101 | 10.8/10.09 | 0/0 |
| PM acetate | 53.48/0.0 | 49.96/0 |
| lubricant additive[7] | 0.3/0.56 | 0.3/0.62 |
| wetting additive[8] | 0.2/0.10 | 0.2/.11 |

[5]PE 6607 from Allnex
[6]PHENODUR VPR-1785/65 B from Allnex
[7]C-SYN Flex 211 from Custom Synthesis LLC
[8]BYK-301 from ByK Chemie Coatings D and E were applied to tin free steel ("TFS") and electrotin plate ("ETP") using industry standard RDS metering rods; the coating was drawn down and cured to form a clear gold film by baking at 400° F. for 12 minutes to a dry film thickness of 16-18 mg/4 in$^2$. The coated metal was then tested as indicated below.

Blush/water spotting: Clear film indicates no blush or water spotting. No opaque white spots indicates no water spotting.

X-hatch before and after steaming for 60 minutes at 250° F.: A cross hatch is scribed into the coating surface using an industry standard cross hatch adhesion tester. 3M 610 tape is then firmly applied to the cross hatch. The 610 tape is then quickly removed and adhesion is evaluated on a pass or fail scale with no adhesion loss indicating that the coating passed and minimal to severe adhesion loss indicating that the coating failed.

MEK double rubs: MEK double rubs are evaluated by applying two sheets of 2-ply medical gauze squares to the rounded end of a 2 pound ball-pene hammer. The gauze is secured with a rubber band. MEK is applied to the gauze until it is saturated. The hammer is then placed on the upper edge of the horizontally oriented coated panel. The hammer is then rubbed down and up to complete one double rub. The process is continued repeatedly until bare metal is exposed at the site of the MEK double rubs. The number of MEK double rubs is recorded.

Results shown above indicate positive results obtained with both Coating D and coating E, with Coating D having better corrosion resistance as indicated by higher MEK rubs.

|  | Coating D | | Coating E | |
|---|---|---|---|---|
|  | TFS | ETP | TFS | ETP |
| Blush/water spotting | PASS | PASS | PASS | PASS |
| X-hatch before | PASS | PASS | PASS | PASS |
| X-hatch after | PASS | PASS | PASS | PASS |
| MEK | 6 | 17 | 4 | 7 |

What is claimed is:

1. A metal can coated at least in part with a coating composition comprising shellac, an acrylic resin, an epoxidized vegetable oil comprising epoxidized soybean oil, an amine terminated polyamide having an amine value of 220 to 250 as determined by filtration with HBr in HBr/acetic acid using methyl violet indicator, a silanol functional silsesquioxane silicone resin, and a crosslinker comprising benzoguanamine.

2. The metal can of claim 1, wherein the shellac comprises 5 to 40 wt % of the composition with wt % based on total solids weight of the composition.

3. The metal can of claim 1, wherein the coating composition further comprises a polyester resin.

4. The metal can of claim 1, wherein the coating composition comprises 10 wt % or less phenolic, with wt % based on total solids weight of the composition.

5. The metal can of claim 1, wherein the coating composition comprises 5 wt % or less phenolic, with wt % based on total solids weight of the composition.

6. The metal can of claim 1, wherein the coating composition comprises 1 wt % or less phenolic, with wt % based on total solids weight of the composition.

7. The metal can of claim 1, wherein the inside of the can is coated at least in part with a coating composition comprising shellac.

8. The metal can of claim 1, wherein the acrylic resin comprises 1 wt % or less of styrene.

* * * * *